United States Patent
Hedrick et al.

(10) Patent No.: US 9,803,571 B2
(45) Date of Patent: Oct. 31, 2017

(54) DUAL-FUEL DIESEL ENGINE WITH CYLINDER FUELING CONTROL OF GASEOUS FUELING AT LESS THAN FULL LOADS

(71) Applicant: Southwest Research Institute, San Antonio, TX (US)

(72) Inventors: John C. Hedrick, Boerne, TX (US); David P. Branyon, San Antonio, TX (US); Timothy J. Callahan, San Antonio, TX (US); Jeremy D. Eubanks, San Antonio, TX (US); Ryan C. Roecker, Fair Oaks Ranch, TX (US); Garrett L. Anderson, Seguin, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 15/004,902

(22) Filed: Jan. 23, 2016

(65) Prior Publication Data

US 2017/0211490 A1 Jul. 27, 2017

(51) Int. Cl.
*F02D 41/30* (2006.01)
*F02D 41/00* (2006.01)
*F02D 41/26* (2006.01)
*F02B 43/10* (2006.01)

(52) U.S. Cl.
CPC .......... *F02D 41/0025* (2013.01); *F02B 43/10* (2013.01); *F02D 41/26* (2013.01); *F02D 41/3005* (2013.01)

(58) Field of Classification Search
CPC .. F02D 41/0025; F02D 41/26; F02D 41/3005; F02D 41/008; F02D 41/402; F02D 19/06; F02D 19/0602; F02D 19/0607; F02D 19/061; F02B 2043/103; F02B 43/10
See application file for complete search history.

(56) References Cited

U.S. PATENT DOCUMENTS

| | | | | |
|---|---|---|---|---|
| 5,355,854 A * | 10/1994 | Aubee | ...................... | F02B 69/00 123/27 GE |
| 6,101,986 A * | 8/2000 | Brown | ................ | F02D 19/0628 123/27 GE |
| 6,543,395 B2 * | 4/2003 | Green | ....................... | F02B 3/06 123/27 GE |
| 7,019,626 B1 * | 3/2006 | Funk | ................... | F02D 19/0647 123/205 |
| 8,099,949 B2 * | 1/2012 | Leone | ................... | F02D 19/081 60/274 |
| 8,417,436 B2 * | 4/2013 | Russell | ................. | F02D 35/027 701/103 |

(Continued)

*Primary Examiner* — Hai Huynh
(74) *Attorney, Agent, or Firm* — Livingston Law Firm

(57) ABSTRACT

A method, used with dual-fuel engine, of controlling the amount of gaseous fuel delivered to the engine. At operating conditions that result in an equivalence ratio below a predetermined threshold (which typically occur at mid or part loads), it is determined whether better performance and/or lower emissions can be achieved by reducing gaseous fuel to some cylinders and increasing gaseous fuel to others. Typically, the gaseous fuel is reduced to zero to a number of cylinders and increased to others, with the increase resulting in an equivalence ratio that will provide improved emissions and efficiency and the desired engine output.

9 Claims, 9 Drawing Sheets

(56) References Cited

U.S. PATENT DOCUMENTS

| | | | |
|---|---|---|---|
| 9,279,378 B2* | 3/2016 | Katayama | F02D 41/0085 |
| 9,297,320 B2* | 3/2016 | Hilditch | F02M 26/16 |
| 2009/0071453 A1* | 3/2009 | Stockhausen | F02D 19/081 |
| | | | 123/577 |
| 2013/0311066 A1* | 11/2013 | Guimaraes | F02D 41/3094 |
| | | | 701/104 |
| 2014/0238340 A1* | 8/2014 | Dunn | F02M 43/00 |
| | | | 123/299 |
| 2015/0240738 A1* | 8/2015 | Yerace | F02B 3/08 |
| | | | 123/27 GE |
| 2016/0069286 A1* | 3/2016 | Zielinski | F02D 41/0002 |
| | | | 123/445 |

* cited by examiner

DUAL-FUEL DIESEL ENGINE WITH CYLINDER FUELING CONTROL OF GASEOUS FUELING AT LESS THAN FULL LOADS

TECHNICAL FIELD OF THE INVENTION

This invention relates to dual-fuel diesel engines, and more particularly to improved operation of such engines at light and part loads.

BACKGROUND OF THE INVENTION

"Dual-fuel engines" are internal combustion engines configured to operate on both a gaseous fuel and diesel fuel simultaneously. The typical gaseous fuel used in dual-fuel engines is natural gas. However, other gaseous fuels such as propane or hydrogen could be used.

In a dual-fuel engine, the diesel fuel is important for ignition; it auto ignites under compression and its combustion ignites the natural gas. The use of natural gas to replace a significant portion of the fuel energy provided by diesel fuel contributes to lowered emissions and operating costs.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to increasing a dual-fuel engine's ability to perform well at part load conditions. As explained below, a problem at lower loads is the reduction of the engine's equivalence ratio. This problem is overcome, and the equivalence ratio maintained within an acceptable range, by optimizing gaseous fueling on a per-cylinder basis. Specifically, at lower loads, the amount of gaseous fuel is turned off to some cylinders, and increased to others. As a result, emissions are reduced, and engine speed and power are maintained.

The dual-fuel engine is assumed to be an internal combustion engine, operating without a throttle at a lean air-fuel ratio. It is assumed that the dual-fuel engine is of the type that is capable of operating with 100% diesel fuel if desired. In the embodiments of this description, the engine is a heavy duty off-highway engine, but the same concepts apply to other dual-fuel engines operating at variable loads in automotive and other applications.

In a dual-fuel engine, the air-fuel ratio is determined in terms of air to total fuel, i.e., the ratio of air to the sum of diesel and gaseous fuel. As the engine load decreases, the fuel system(s) decreases the amount of fuel delivered to the engine cylinders without actively attempting to reduce airflow. As a result, the engine runs even more lean, that is, there is an increase in the ratio of air to total fuel (both diesel and gaseous). The equivalence ratio is specifically the total fuel equivalence ratio, or for the combined fuel amounts and properties, the ratio of the stoichiometric air-fuel ratio to the actual air-fuel ratio.

For purposes of example herein, the gaseous fuel is assumed to be natural gas. However, the same concepts apply to dual-fuel engines using other types of gaseous fuels.

Due to today's relative fuel prices, it is economical to minimize the amount of diesel fuel consumed relative to the gaseous fuel. Thus, to the extent feasible, dual-fuel engines attempt to maximize the substitution of gaseous fuel for diesel fuel.

Figure 1:
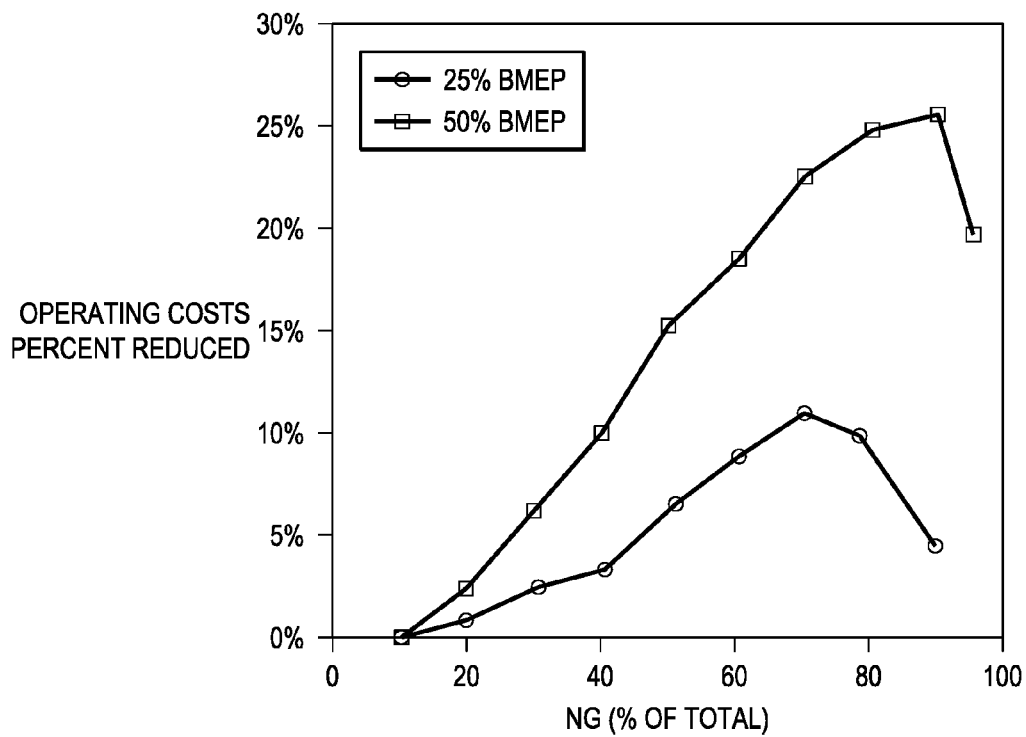
FIG. 1 illustrates how, in general, estimated engine operating costs are reduced with an increase in the "gaseous fuel substitution rate".

FIG. 1 illustrates, for an example test engine at lower loads, estimated reduction of engine operating costs as a function of the percent of natural gas relative to diesel fuel. This percentage is referred to herein as the "gaseous fuel substitution rate". The engine is assumed to be operating at high speed (1815 rpm).

Reductions of operating costs are shown at both 25% and 50% of maximum engine load (in terms of BMEP). For purposes of the description, engine loads of 20%+/−about 15% can be considered "light load". Engine loads of 50%+/− about 15% can be considered "mid load". Both "light" and "mid" loads can be considered "part load".

Figure 2:
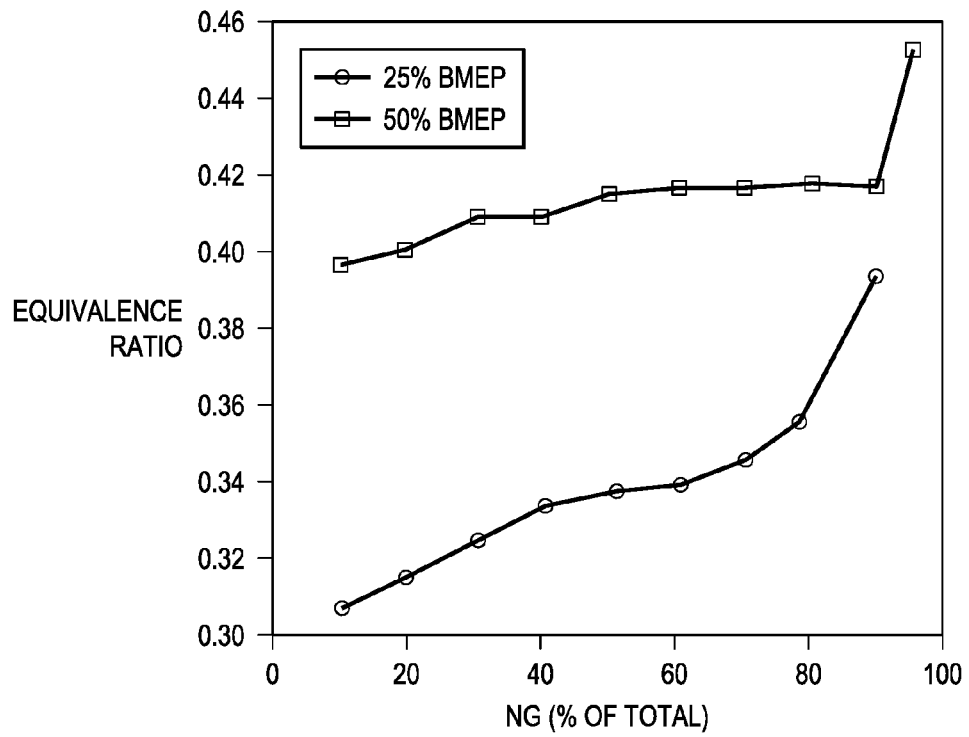
FIG. 2 illustrates, for an example test engine at lower loads, how the total (diesel and gaseous fuel) equivalence ratio is lower as the load decreases.

FIG. 2 illustrates, for the same engine at light (25%) and mid (50%) loads, how the equivalence ratio is lower as the load decreases. Decreased equivalence ratios at light and mid loads is a result of the diesel engine not being fitted with a throttle in the intake system to reduce air flow and maintain an acceptable equivalence ratio. The lower equivalence ratios increase CO and HC emissions to unacceptable levels, and cause lower brake thermal efficiency (BTE) thereby reducing the cost benefit of dual-fuel operation.

Figure 3:
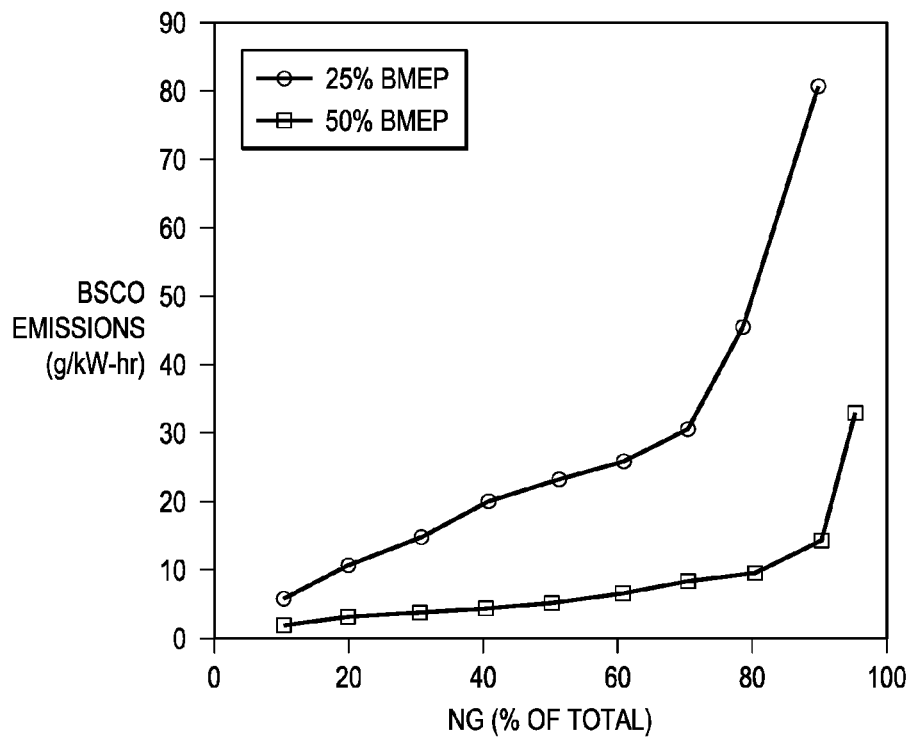
FIGS. 3-5 illustrate the effect of lower loads on CO and HC emissions, and on BTE, respectively, at varying gaseous fuel substitution rates.
Figure 4:
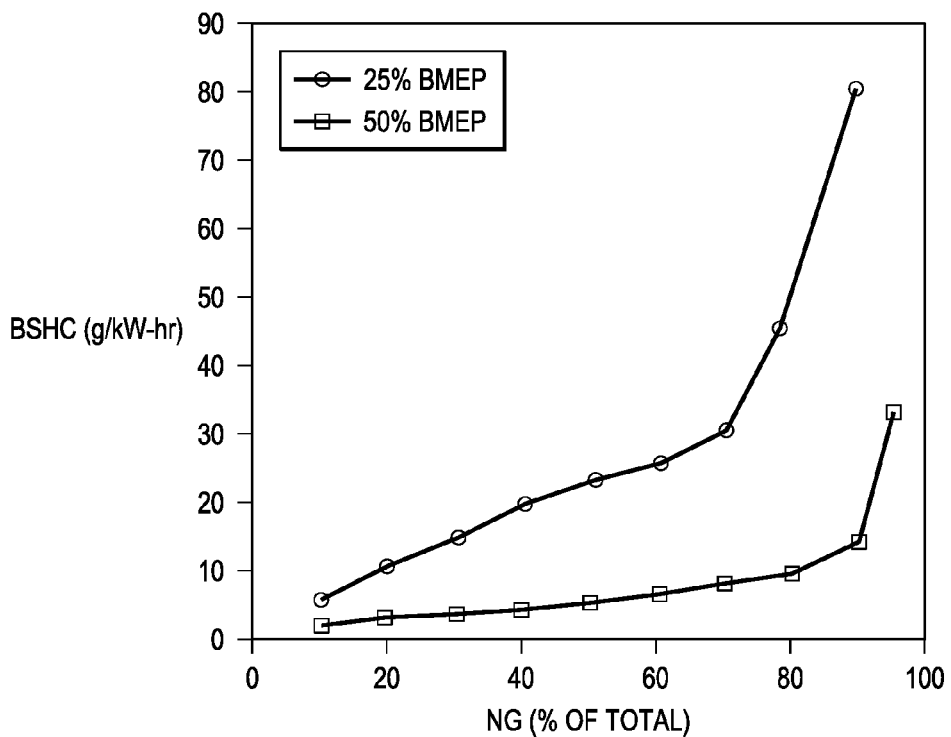
Figure 5:
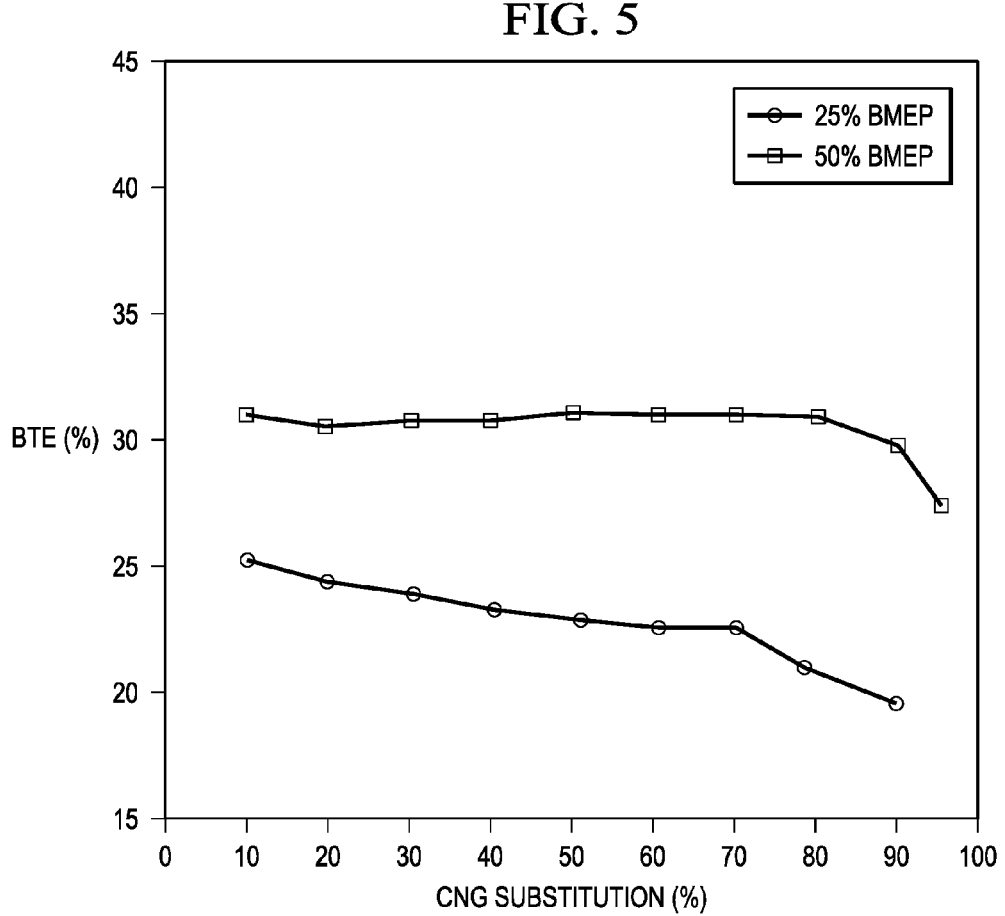

FIGS. 3-5 illustrate the effect of reduced load on CO and HC emissions, and on BTE, respectively, at varying gaseous fuel substitution rates. Two load points, 25% and 50% are illustrated, but the same effect of reduced load on emissions and BTE could be plotted for any load point while operating on dual-fuel.

At lower loads, one approach to minimizing CO and HC emissions is to transition to 100% diesel operation. However, this can mean that for a large amount of the operating time the engine will not be burning natural gas and the operating cost reduction will be sub-optimal.

Another approach to improving light load operation on dual-fuel engines is the addition of a throttle to the intake system. Although the use of a throttle can increase the equivalence ratio at light load conditions, the addition of a throttle to a dual-fuel engine presents a number of other problems.

Figure 6:
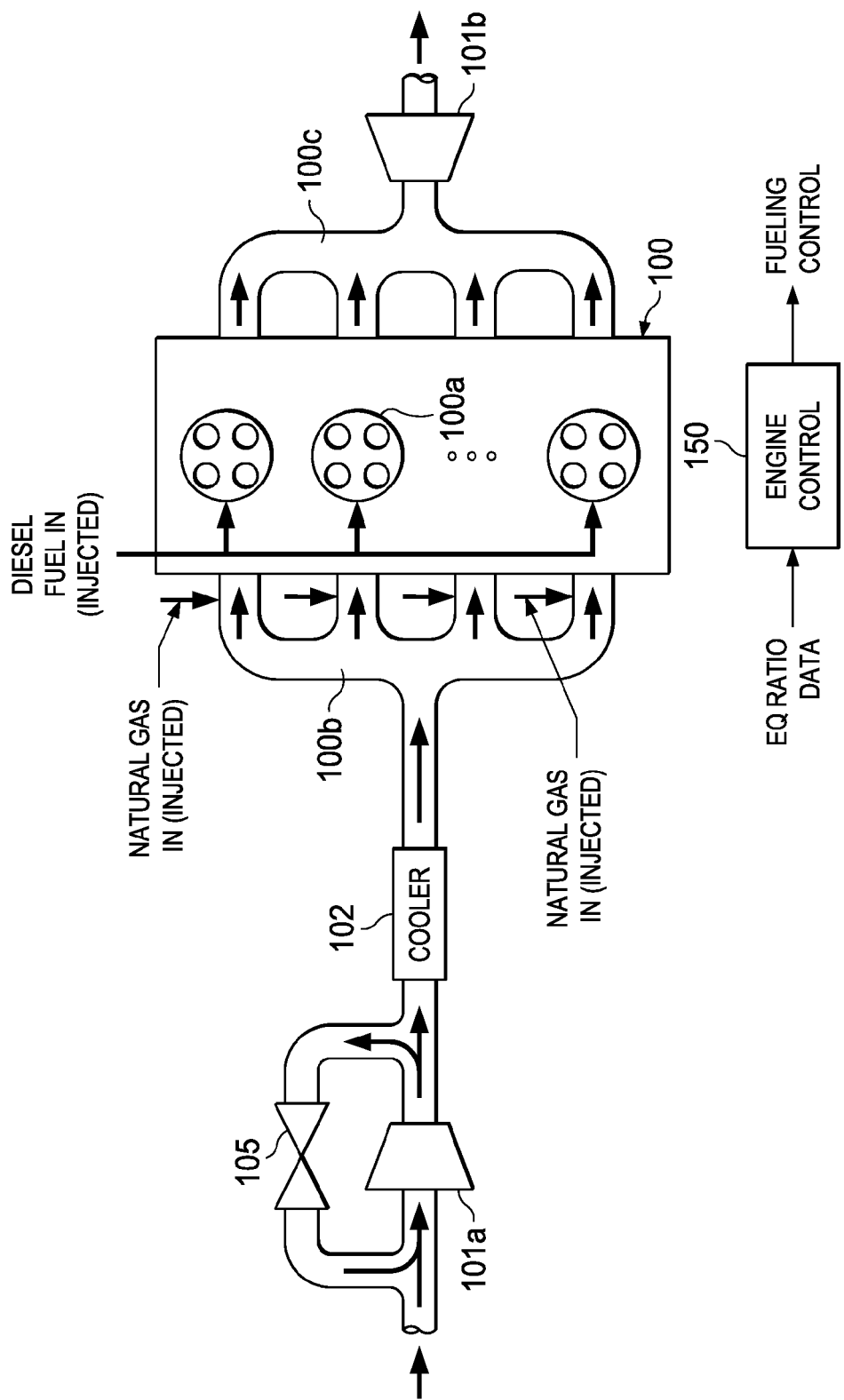
FIG. 6 illustrates a dual fuel engine with timed port gaseous fuel injection, and configured for gaseous fueling control in accordance with the invention.

FIG. 6 illustrates a dual fuel engine 100 configured for gaseous fueling control in accordance with the invention. In this embodiment, engine 100 is a dual-fuel engine equipped so that the amount of gaseous fuel delivered to each cylinder can be independently controlled. To this purpose, the gaseous fuel to each cylinder is port injected or direct injected. This is in contrast to other dual-fuel engines that use a fumigation process to mix the gaseous fuel with intake air at or prior to entering the manifold. The gaseous and diesel injectors are not explicitly shown, but the delivery of gaseous and diesel fuel is indicated and it is assumed that each cylinder is equipped with appropriate injectors as described herein.

Dual fuel engine 100 has a number of cylinders 100*a*, an intake manifold 100*b* and an exhaust manifold 100*c*. In the example of this description, engine 100 has twelve cylinders, but the same concepts may be applied to engines having some other number of cylinders.

Engine 100 is appropriately equipped to operate on dual fuel, that is, both diesel and a gaseous fuel. For purposes of this description, the gaseous fuel is assumed to be natural gas.

In the example of FIG. 6, engine 100 is a turbocharged engine, having both a compressor 101*a* and turbine 101*b*, both of which may be positioned and used in a conventional manner. Engine 100 may be further equipped with intake boost control devices, such as an optional bypass valve 105 or a turbine waste gate (not shown). A cooler 102 cools the intake air downstream of the compressor 101*a*.

In the example of FIG. 6, engine 100 uses timed port injection to introduce natural gas into the intake ports, with the gas being subsequently carried into the combustion chambers of the engine cylinders 101. As explained below, a feature of timed port injection for the gaseous fuel is that the amount of gaseous fuel delivered to the cylinders can be controlled on a cylinder-to-cylinder basis. For this reason, the same concepts could be applied to an engine having direct cylinder injection. Other embodiments, described below, can be implemented for fumigated engines by controlling the amount of gaseous fuel delivered to banks of cylinders as opposed to individual cylinders.

Engine 100 is equipped with a control unit 150, whose features significant to this embodiment are the ability to receive data representing engine equivalence ratio conditions and to use this data to control the gaseous fuel delivered to individual cylinders. Control unit 150 has appropriate hardware and programming for performing these tasks as described herein. It may be part of a more comprehensive engine control unit, and only those tasks relevant to this description are discussed herein.

Referring again to FIGS. 2-5, if a conventional dual fuel engine was targeting 80 percent natural gas substitution at 25% load, the equivalence ratio would be unacceptably lean. At this equivalence ratio, approximately 0.35, the engine would produce high CO and HC emissions. The BTE would also be low.

Figure 7:
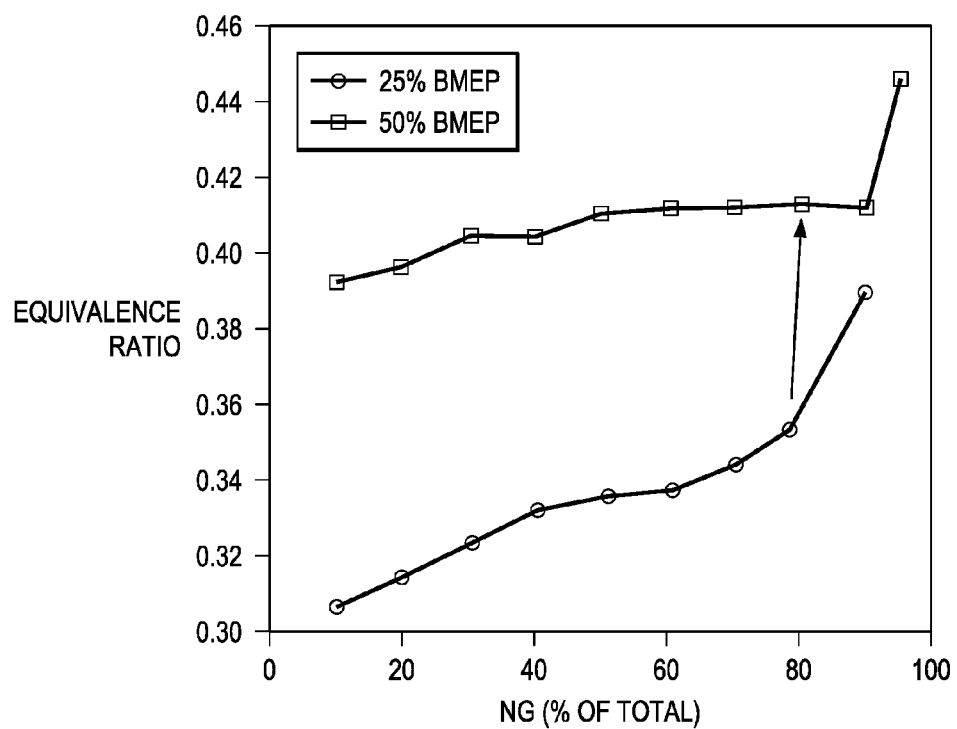
FIG. 7 illustrates how the engine of FIGS. 1-6 is operated at 25% load in accordance with the invention.
Figure 8:
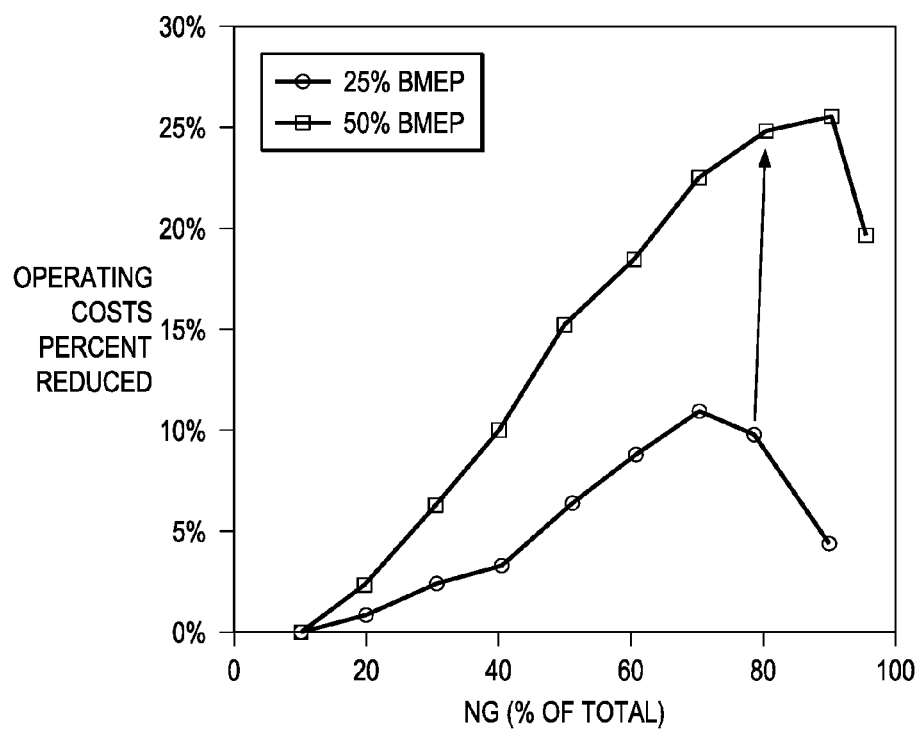
FIGS. 8-11 illustrate, for a 25% engine load output, with gaseous fuel eliminated to half the cylinders and increased to the other half, the effect on operating costs, on HC and CO emissions, and on BTE.
Figure 9:
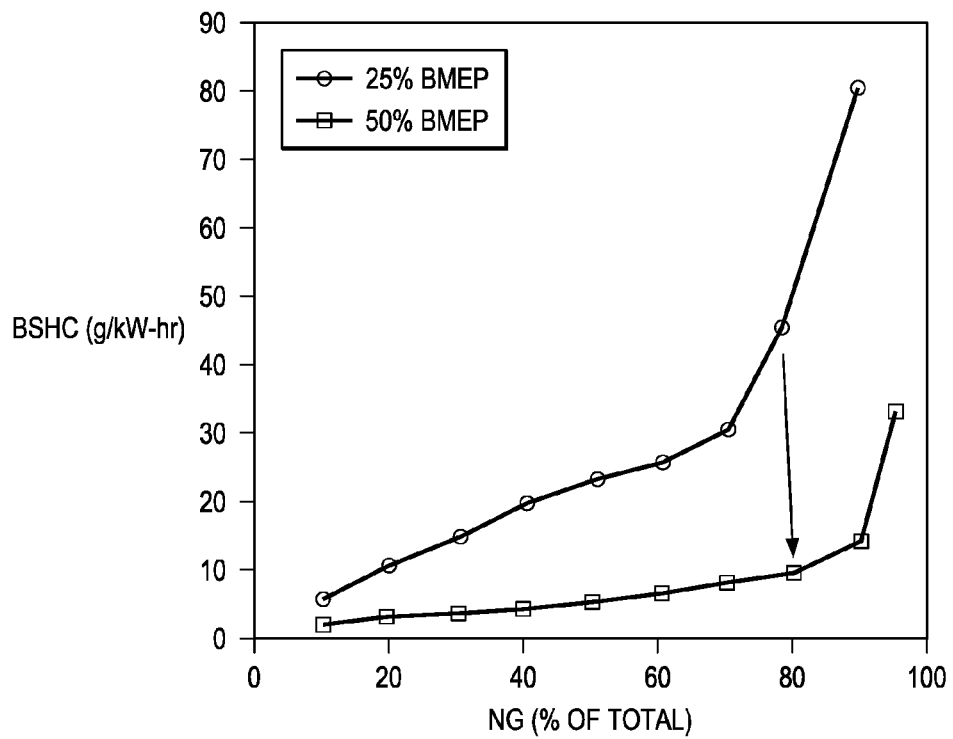
Figure 10:
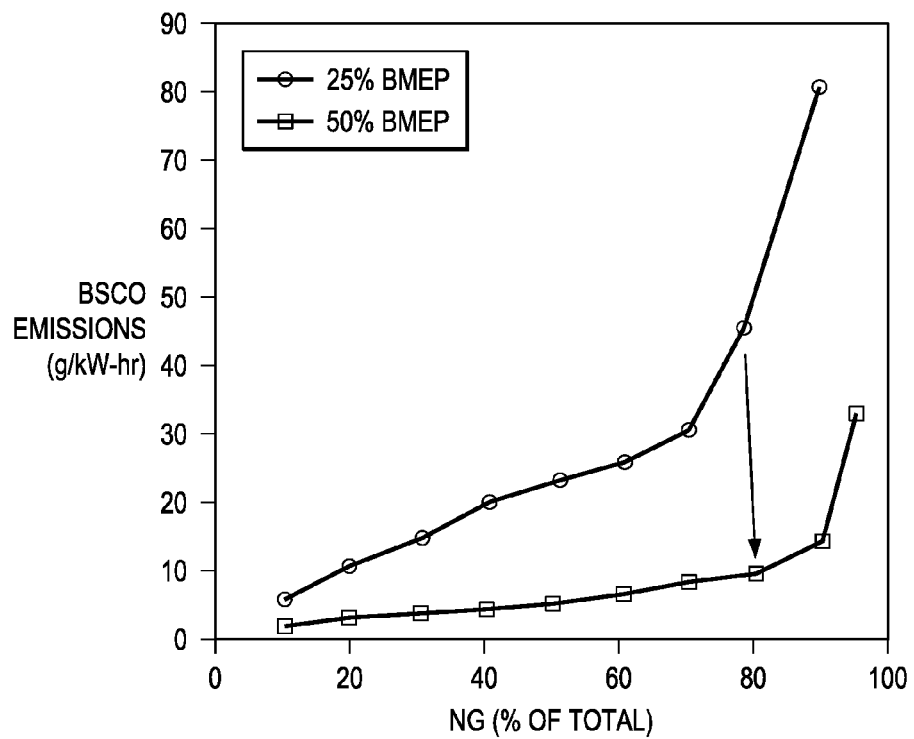
Figure 11:
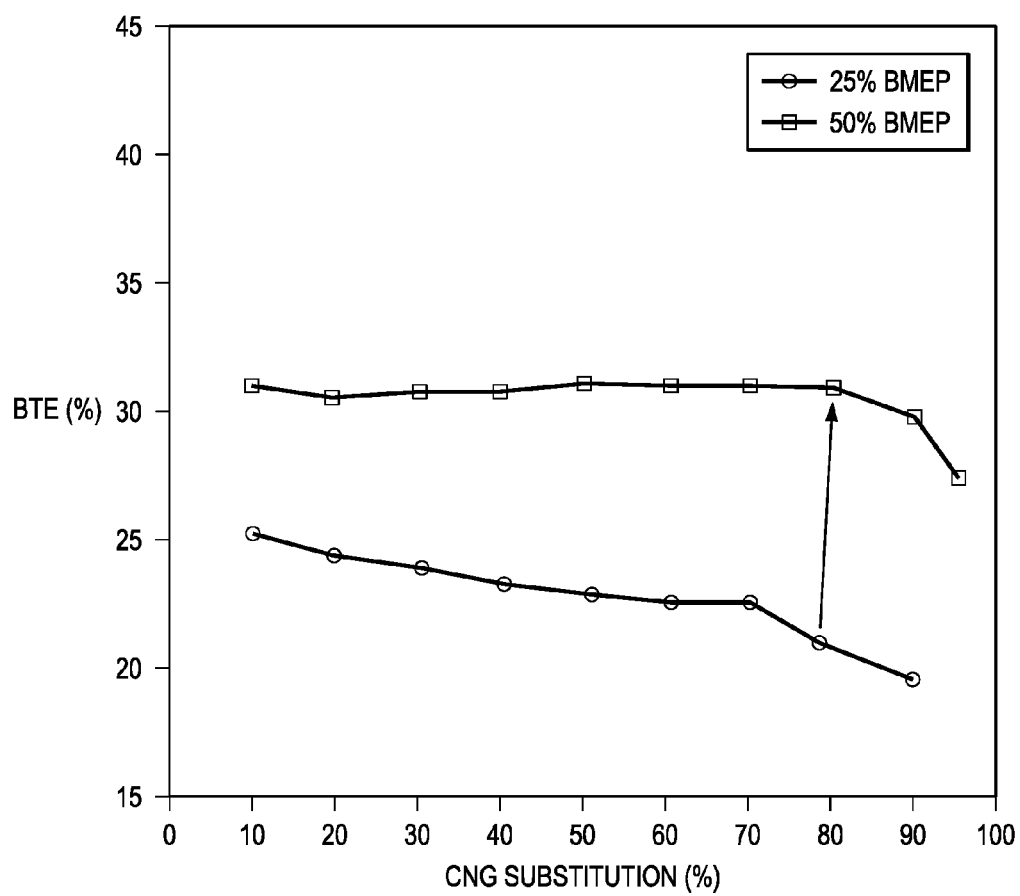

FIG. 7 illustrates how the engine of FIGS. 1-6 is operated at 25% load in accordance with the invention. For this load condition, the amount of gaseous fuel is reduced to zero to half the cylinders and doubled to the remaining cylinders. Depending on the particular engine, and its control of diesel fuel injectors, a pilot diesel amount may be maintained for the cylinders not receiving gaseous fuel, or the diesel fuel may be reduced to zero to those cylinders.

With this increase in gaseous fuel to half the cylinders, it is possible to move the equivalence ratio in those cylinders from approximately 0.35 to 0.41. The cylinders receiving the increased gaseous fuel (herein referred to as the "increased-fueled cylinders") must operate at double the BMEP to provide the same engine shaft horsepower. For these cylinders, their equivalence ratio moves to the level of 50% load.

Thus, overall, at this 25% load, the engine has improved emissions and BTE, but maintains the desired power and speed for the light load.

FIGS. 8-11 illustrate, for the same 25% load example, how cutting off gaseous fuel to one half the cylinders and increasing the gaseous fuel to the remaining cylinders has a beneficial effect on operating costs, HC emissions, CO emissions, and BTE. In each case, the increased-fueled cylinders exhibit the advantages of cylinders having a 50% load.

The same concepts can be applied to any load point less than full load. Each load point can be analyzed in terms of substitution rates, emissions, operating costs, and BTE to determine an optimal number of cylinders to provide with gaseous fuel and the amount of gaseous fuel to deliver.

Generally, for a particular engine type and model, the method involves mapping, for each load point, a desired number of cylinders to fuel with gaseous fuel. For engines running at high substitution rates, both the gaseous fuel and the diesel fuel may be shut off. For each load point, for cylinders that are to receive gaseous fuel, a further mapping is made for an amount of gaseous fuel to deliver that will maintain the desired engine output.

It is expected that loads over a certain threshold, for example 75%, will be considered "high load", and all cylinders will be receive a "normal" gaseous fuel substitution rate, with equal amount of gaseous fuel to each cylinder. At loads below that threshold, one or more cylinders will have their gaseous fuel reduced, typically to zero, allowing the diesel fuel to those cylinders to also be shut off. The remaining cylinders will have their gaseous fuel increased.

For a certain range of loads, perhaps 25% to 50%, the method can be implemented by reducing (typically to zero) gaseous fuel to half of the cylinders and doubling the gaseous fuel to the other half. For loads less than 25%, it may be that more than half of the cylinders are cut off from gaseous fuel, and the gaseous fuel to other cylinders increased. For loads above 50% but less than full load, it may be that fewer than half of the cylinders are cut off from gaseous fuel, and the fuel to other cylinders increased. It should be understood that the number of cylinders for which gaseous fuel is turned off and the number of cylinders for which gaseous fuel is increased need not be the same. It is also possible that not all cylinders undergo a fueling adjustment.

As stated above, for each load point, the emissions and BTE can be determined at the engine's "normal" gaseous fuel substitution rate. If any of those parameters are unacceptable, an adjusted gaseous fueling can be determined for un-fueled and increased-fueled cylinders, which will provide the desired engine output. In addition to emissions and BTE, other engine operating parameters, such as the engine's tendency for knock, can be used to determine the fueling adjustment.

Figure 12:
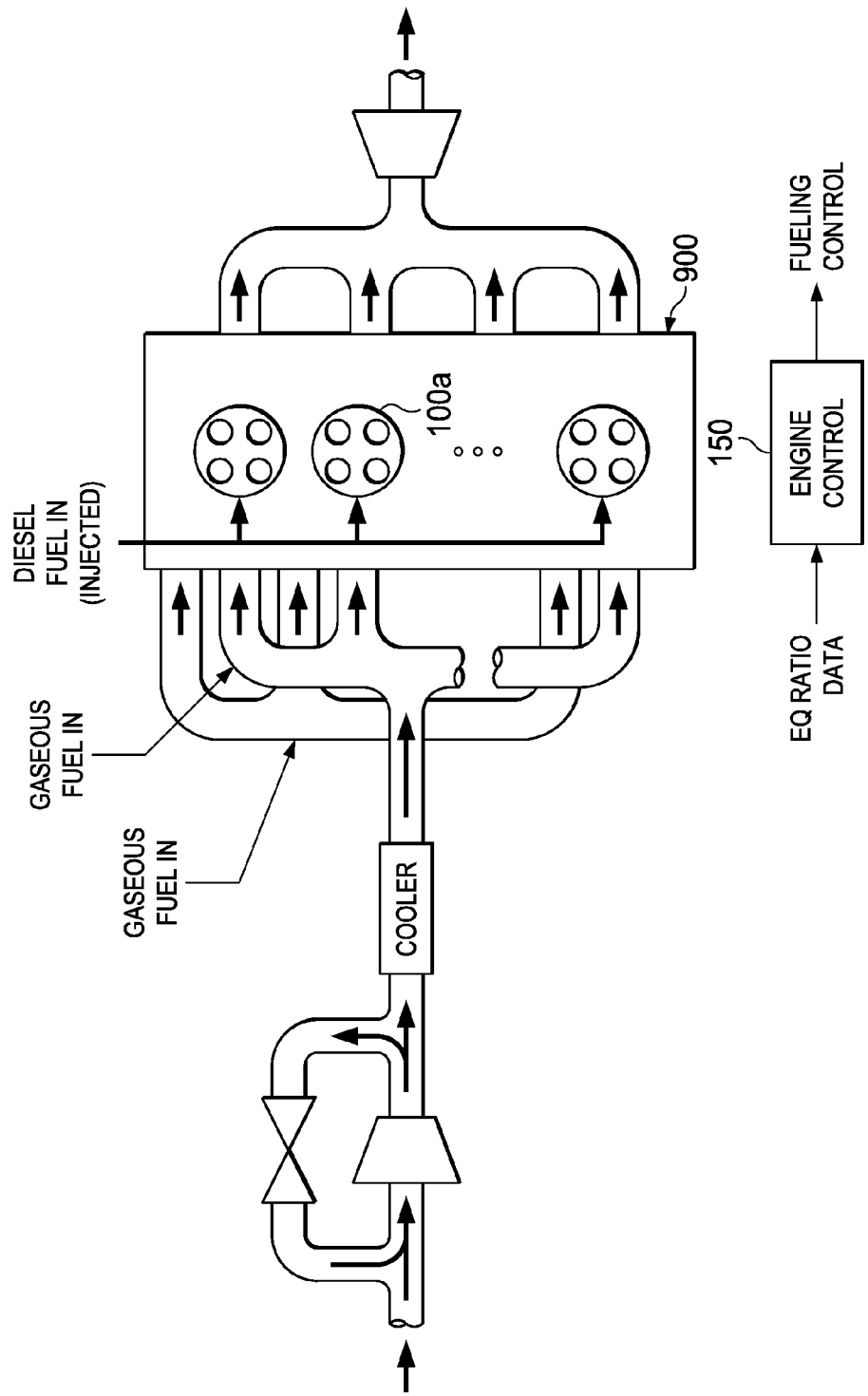
FIG. 12 illustrates a dual fuel engine with fumigated gaseous fuel delivery, and configured for gaseous fueling control in accordance with the invention.

FIG. 12 illustrates a dual-fuel engine 900 equipped with fumigation gaseous fuel delivery. Apart from the delivery of natural gas to the cylinders, engine 900 is similar to engine 100.

A feature of engine 900 is that the fumigation system allows separate control of two banks of cylinders. In other words, the delivery of gaseous fuel to one bank of cylinders can be controlled separately from delivery of fuel to a second bank of cylinders. Typically, each bank of cylinders comprises half the total number of cylinders.

For example, in a twelve cylinder engine, in light load conditions, the gaseous fuel delivered to a first manifold associated with six cylinders could be shut off. At the same time, the gaseous fuel delivered to a second manifold associated with the other six cylinders could be increased to a level at or near mid load levels.

For both injection (FIG. 6) and fumigated (FIG. 12) gaseous fuel delivery systems, for the above-described method, an added feature of the invention is the cutting of the diesel pilot fuel to any cylinders not receiving gaseous fuel. As indicated above, this feature may depend on the diesel fuel injection system of the particular engine.

Also, for engines configured for intake valve cutout, this feature may be used for any increased-fueled cylinders to further assist in allowing those cylinders to achieve a higher equivalence ratio.

Figure 13:
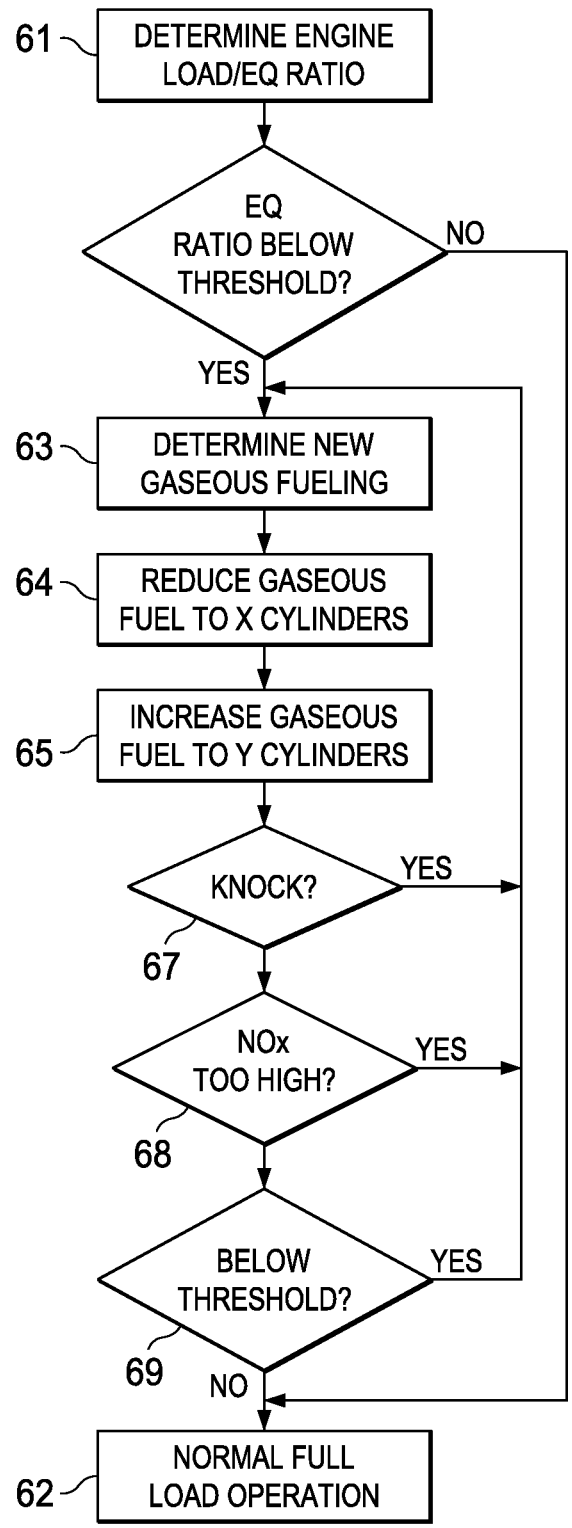
FIG. 13 illustrates a method of controlling gaseous fueling for less than full loads in accordance with the invention.

FIG. 13 illustrates an overview of the method and its control processes. The method is performed during engine operation and controls the gaseous fuel delivered to the engine on a continuous basis as speed and load conditions (and hence equivalence ratios) change. For a vehicle, load conditions may be a result of the operation of an accelerator pedal, which represents a request to increase torque.

The method is performed by an engine control unit, such as control unit 150. The various steps may be implemented as processes performed by the engine control unit. Control unit 150 has stored data, representing for each engine load point, how many cylinders, if any, for which gaseous fuel is to be cut out or reduced, as well as how many, if any, cylinders for which gaseous fuel is to be increased. If those cylinders are to also have diesel fuel cut off, that information is also stored. A target equivalence ratio, which will determine the amount of gaseous fuel reduction or increase, is also stored for each load point.

Step 61 is determining the current condition of the engine. In the examples above, the method was performed at 25% light load. However, any load less than full load could be used to trigger the method. Additionally, equivalence ratio could be used to trigger the method rather than engine load.

A monitoring process monitors current engine conditions, and receives "engine condition data" from various sensors associated with the engine. It may use these values, as well as stored engine modeling algorithms, to determine current engine load as the vehicle is in operation. Equivalence ratio may be determined from measured exhaust 02 levels or from determinations of fuel and air flow.

As indicated by Step 62, if the engine equivalence ratio is above a predetermined "minimum optimum" value, the engine is operated according to normal high load conditions. All cylinders receive diesel and gaseous fuel at a substitution rate optimized for high load conditions, and all cylinders receive the same amount of gaseous fuel. That is, emissions are at acceptable levels and fueling economies are maintained at "normal" gaseous fuel substitution rates.

In Step 63, if the engine is below the minimum acceptable equivalence ratio, stored data and algorithms are accessed that optimize the number of cylinders firing with both gaseous and diesel fuel to maintain a target equivalence ratio of those cylinders. As explained above, in general, the lighter the load, the more cylinders will have their gaseous fuel reduced (or turned off).

The increase of gaseous fuel to cylinders whose gaseous fuel is increased will be an amount that brings the equivalence ratio and the engine power to a level that compensates for the output lost from cylinders whose gaseous fuel is reduced. In other words, the overall engine output is at the desired load.

Steps 64 and 65 are generating appropriate control signals to control the gaseous fuel delivered to the cylinders, as determined in Step 63.

Steps 67 and 68 are feedback steps, which may be used to adjust gaseous and diesel fueling if knock is present or NOx levels are too high. If knock occurs at lighter loads with cylinders turned off, an adjustment can be made so that one or more additional cylinders are fueled. Similarly, if NOx levels are too high, an adjustment can be made such that one or more additional cylinders are fueled. In both cases, adding to the number of fueled cylinder(s) will reduce the equivalence ratio in the fueled cylinders and reduce knock or lower NOx emissions. Referring again to FIGS. 6 and 12, the engine can be equipped with a knock sensor and NOx sensor for this purpose.

Although not shown in FIG. 13, an additional step of shutting off diesel fuel may be performed for any cylinders whose gaseous fuel has been reduced to zero in Step 64.

As indicated in Step 69, the fueling adjustment process is performed continuously during engine operation. Data representing a current equivalence ratio is received and processed to maintain an equivalence ratio that is acceptable for current operating conditions.

What is claimed is:

1. A method of fueling a dual-fuel internal combustion engine, the engine being fueled with both gaseous fuel and diesel fuel, and the engine being configured so that the amount of gaseous fuel delivered to its cylinders can be controlled individually or in groups of cylinders, comprising:

determining the current engine equivalence ratio;

comparing the current engine equivalence ratio to a predetermined threshold;

if the current engine equivalence ratio is above the threshold, operating the cylinders at a predetermined percentage of diesel fuel to gaseous fuel with each cylinder receiving an equal amount of gaseous fuel;

if the current engine equivalence ratio is below the threshold, determining a number of cylinders for which gaseous fuel is to be shut off and a number of cylinders for which gaseous fuel is to be increased;

determining the amounts of gaseous fuel for the cylinders with increased fueling such that the increased fueling compensates for engine output lost from the cylinders for which gaseous fuel is shut off;

delivering control signals to the cylinders for which gaseous fuel is to be shut off; and delivering control signals to the cylinders for which gaseous fuel is to be increased.

2. The method of claim 1, wherein the step is determining the amounts of gaseous fuel is performed by doubling the gaseous fuel to the cylinders whose fuel is to be increased.

3. The method of claim 1, wherein the gaseous fuel is reduced to one-half the cylinders and increased to the other half of the cylinders.

4. The method of claim 1, wherein the gaseous fuel is reduced or increased on a cylinder-by-cylinder basis.

5. The method of claim 1, wherein the gaseous fuel is reduced or increased to groups of cylinders.

6. The method of claim 1, wherein for those cylinders for which the gaseous fuel is shut off, further comprising the step of shutting off diesel fuel to those cylinders.

7. The method of claim 1, wherein the gaseous fuel is natural gas.

8. The method of claim 1, further comprising adjusting the air intake to the cylinders for which gaseous fuel is to be increased.

9. A controller for controlling the amount of gaseous and diesel fuel delivered to a dual-fuel internal combustion engine, the engine being fueled with both gaseous fuel and diesel fuel, and the engine being configured so that the amount of gaseous fuel delivered to its cylinders can be controlled individually or in groups of cylinders, comprising:
- a processor and memory system programmed to perform the following tasks: determine the current engine equivalence ratio;
- if the engine equivalence ratio is above a predetermined threshold, operating the cylinders at a predetermined load percentage of diesel fuel to gaseous fuel with each cylinder receiving the same amount of gaseous fuel;
- if the engine equivalence ratio is below the threshold, determining a number of cylinders for which gaseous fuel is to be shut off and a number of cylinders for which gaseous fuel is to be increased;
- determining the amounts of gaseous fuel to be increased such that the increased fueling compensates for engine output lost from cylinders for which gaseous fuel is shut off;
- delivering control signals to the cylinders for which gaseous fuel is to be shut off; and
- delivering control signals to the cylinders for which gaseous fuel is to be increased.

* * * * *